United States Patent
Ramaswamy et al.

(10) Patent No.: US 9,297,367 B2
(45) Date of Patent: Mar. 29, 2016

(54) COMBINED GEOTHERMAL AND SOLAR THERMAL ORGANIC RANKINE CYCLE SYSTEM

(75) Inventors: Sitaram Ramaswamy, West Hartford, CT (US); Guangyan Zhu, Avon, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 884 days.

(21) Appl. No.: 12/989,539

(22) PCT Filed: May 2, 2008

(86) PCT No.: PCT/US2008/062361
§ 371 (c)(1),
(2), (4) Date: Jan. 26, 2011

(87) PCT Pub. No.: WO2009/134271
PCT Pub. Date: Nov. 5, 2009

(65) Prior Publication Data
US 2011/0126539 A1  Jun. 2, 2011

(51) Int. Cl.
*F03G 7/00* (2006.01)
*B60K 16/00* (2006.01)
*F03G 6/00* (2006.01)
(Continued)

(52) U.S. Cl.
CPC ............... *F03G 6/003* (2013.01); *F01K 25/08* (2013.01); *F03G 7/04* (2013.01); *F05B 2270/303* (2013.01); *F05B 2270/506* (2013.01); *Y02E 10/10* (2013.01); *Y02E 10/46* (2013.01)

(58) Field of Classification Search
CPC ........... F03G 6/003; F03G 7/04; F01K 25/08; Y02E 10/10; Y02E 10/46; F05B 2270/506; F05B 2270/303
USPC ....................... 60/641.1, 641.2, 641.8, 641.15
See application file for complete search history.

(56) References Cited

U.S. PATENT DOCUMENTS 3,950,949 A * 4/1976 Martin et al. ................. 60/641.8
3,995,429 A * 12/1976 Peters .......................... 60/641.8
4,062,489 A    12/1977 Henderson
(Continued)

FOREIGN PATENT DOCUMENTS

EP       0121392 A2   10/1984
JP    2004286024 A   10/2004
(Continued)

OTHER PUBLICATIONS

International Preliminary Report on Patentability mailed Apr. 15, 2011 (5 pgs.).

(Continued)

*Primary Examiner* — Hoang Nguyen
(74) *Attorney, Agent, or Firm* — Carlson, Gaskey & Olds, PC

(57) ABSTRACT

In a system where the thermal energy of a geothermal fluid is applied to an ORC system, the energy is enhanced by the use of solar energy to thereby increase the temperature of the fluid being applied by the ORC system. A single heat exchanger version provides for direct heat exchange relationship with the geothermal and solar fluids, whereas a two heat exchanger version provides for each of the geothermal and solar fluids to be in heat exchange relationship with the working medium of the ORC system. Control features are provided to selectively balance the various fluid flows in the system.

20 Claims, 7 Drawing Sheets

(51) Int. Cl.
*F01K 25/08* (2006.01)
*F03G 7/04* (2006.01)

(56) References Cited

U.S. PATENT DOCUMENTS

| | | | | |
|---|---|---|---|---|
| 4,280,060 | A * | 7/1981 | Kure-Jensen et al. | 290/40 R |
| 4,336,692 | A | 6/1982 | Ecker et al. | |
| 4,358,929 | A * | 11/1982 | Molivadas | 60/641.8 |
| 4,388,807 | A * | 6/1983 | Matthews | 60/641.4 |
| 4,644,750 | A * | 2/1987 | Lockett et al. | 60/641.2 |
| 4,665,711 | A * | 5/1987 | Page | 62/238.3 |
| 5,272,879 | A * | 12/1993 | Wiggs | 60/676 |
| 6,051,891 | A * | 4/2000 | Surodin | 290/2 |
| 6,581,384 | B1 * | 6/2003 | Benson | 60/653 |
| 6,701,711 | B1 * | 3/2004 | Litwin | 60/641.11 |
| 7,178,337 | B2 * | 2/2007 | Pflanz | 60/641.2 |
| 2006/0048770 | A1 * | 3/2006 | Meksvanh et al. | 126/620 |
| 2006/0137349 | A1 | 6/2006 | Pflanz | |
| 2009/0066086 | A1 * | 3/2009 | Hansen, Jr. | 290/54 |
| 2009/0158736 | A1 * | 6/2009 | Mierisch | 60/641.8 |

FOREIGN PATENT DOCUMENTS

| | | |
|---|---|---|
| JP | 2005083343 A | 3/2005 |
| KR | 20040049213 A | 6/2004 |
| WO | 2008074463 A2 | 6/2008 |
| WO | 2009014480 A1 | 1/2009 |

OTHER PUBLICATIONS

International Search Report and Written Opinion mailed Jan. 9, 2009 (12 pgs.).
International Preliminary Report on Patentability mailed Nov. 11, 2010 (7 pgs.).
Supplementary European Search Report for European Application No. 08747455.7 mailed Aug. 7, 2014.

* cited by examiner

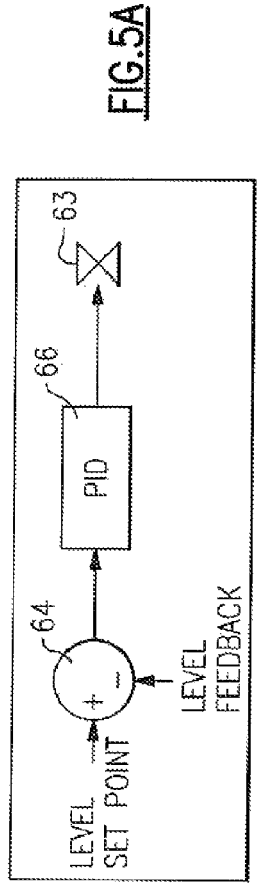
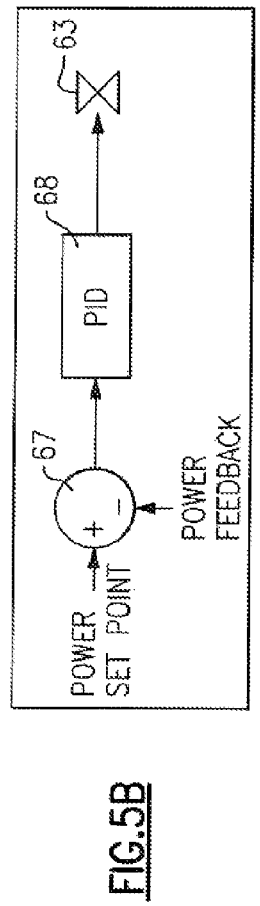
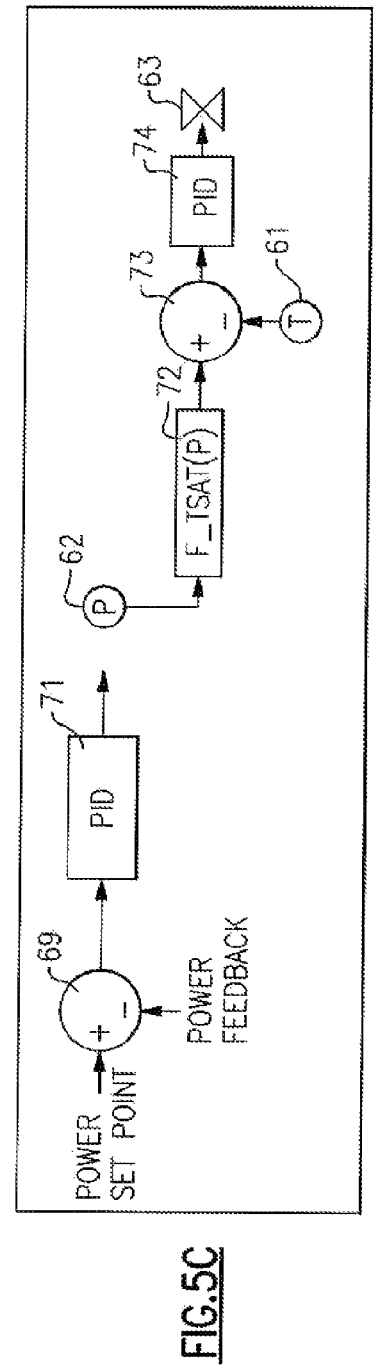
FIG.5A
FIG.5B
FIG.5C

COMBINED GEOTHERMAL AND SOLAR THERMAL ORGANIC RANKINE CYCLE SYSTEM

TECHNICAL FIELD

This disclosure relates generally to rankine cycle systems and, more particularly, to the combined use of geothermal and solar energy to provide the heat to the evaporator thereof.

BACKGROUND OF THE DISCLOSURE

The use of organic rankine cycle (ORC) systems for applying available geothermal energy to the generation of electricity is a known concept, with a particular apparatus for accomplishing this being described in U.S. Pat. No. 7,174,716 assigned to the assignee of the present invention.

Such a use of geothermal energy for generating electrical energy causes a gradual depletion of the available geothermal energy. That is, even though some of the energy removed for the process may be returned (e.g., water is removed at higher temperatures and replaced at lower temperatures), there is necessarily a net loss in available geothermal energy as it is used to power the organic rankine cycle system. Accordingly, the users of such a system prefer to remove as little water from the ground reservoir as needed so as to thereby extend the life of the geothermal reserves.

Geothermal sites are typically located in remote areas with sufficient open space around the area of the ground water site. Such an area would therefore allow for the installation of other structures that could be used to supplement the energy being provided by the geothermal sources. The applicants have recognized that solar energy could be used for that purpose.

DISCLOSURE

In accordance with one aspect of the disclosure, at least one heat exchanger is provided between a geothermal source and an ORC system, and solar energy is directed to the heat exchanger for the purpose of increasing the temperature of the fluid being provided to the ORC system.

In accordance with another aspect of the disclosure, a pair of heat exchangers are disposed in the closed loop circuit of the ORC working medium. In one heat exchanger the geothermal fluid is circulated therethrough to add thermal energy to the working medium and in the other heat exchanger, fluid heated by the solar collectors are circuited therethrough to add thermal energy to the working medium.

In the drawings as hereinafter described, a preferred embodiment and various alternative embodiments are depicted; however, various other modifications and alternate constructions can be made thereto without departing from the spirit and scope of the disclosure.

BRIEF DESCRIPTION OF THE DRAWINGS

FIGS. 5A-5C are schematic illustrations of various possible control methods that may be employed in accordance with the present invention.

DETAILED DESCRIPTION OF THE DISCLOSURE

Figure 1:
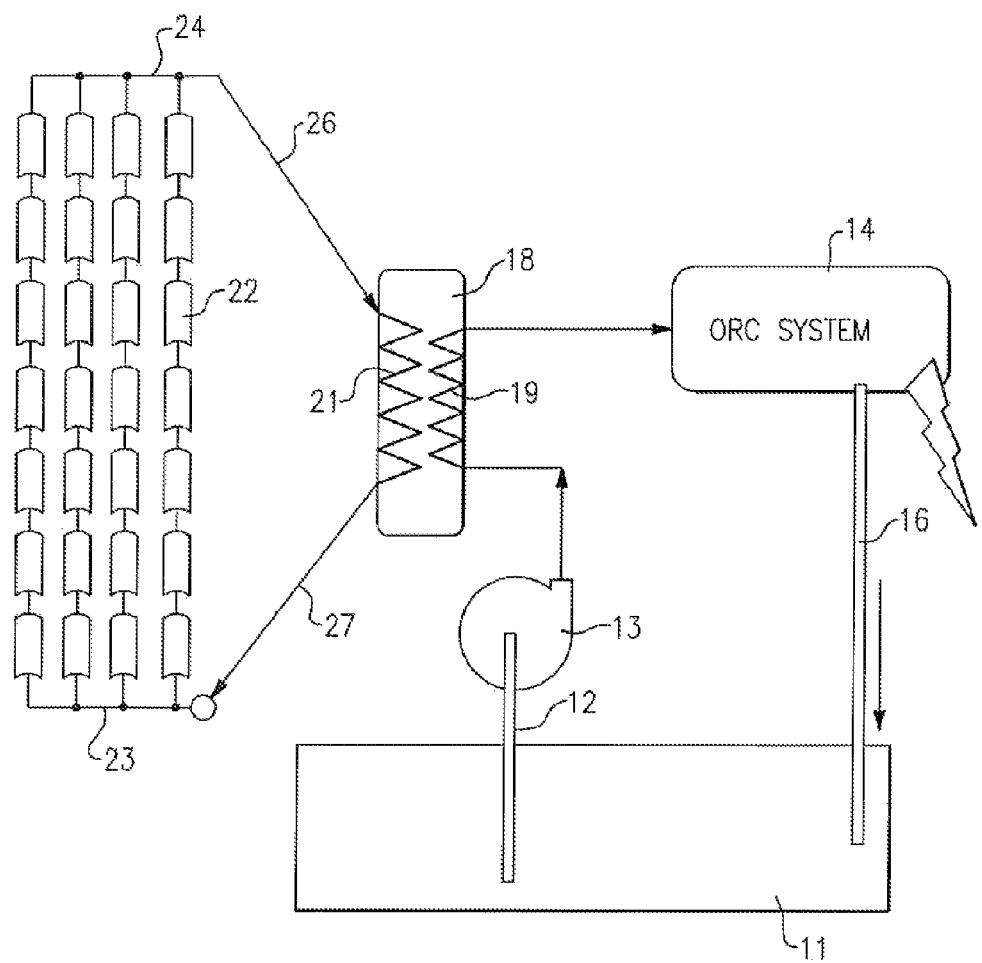
FIG. 1 is a schematic illustration of one embodiment of the disclosure.

A typical geothermal source is shown at 11 in FIG. 1. Such a source comprises a rather large land area, such as 300-5000 acres which contains relatively warm water (i.e. in the range of 65° C. to −400° C.), and which is available for the extraction of thermal energy therefrom. This is commonly accomplished by extracting the warm water by way of a supply line 12 with the use of a pump 13 or the like, applying the water as a direct or indirect heat source to the boiler/evaporator of an ORC system 14 for the generation of electricity, and returning the source water at a lower temperature to a sink portion of the geothermal source 11 by way of a return pipe 16. Typical of such a system operation, with a refrigerant fluid such as R134a, R245fa, being used as the refrigerant in the ORC system 14, the geothermal water is received in the ORC system at a temperature of 65° C.-400° C., and after being applied to the evaporator of the ORC system 14, the geothermal water is returned to the sink of the geothermal source 11 by way of the return pipe 16 at a temperature of about 20° C.-250° C.

In accordance with the present disclosure, a first heat exchanger 18 is provided on the upstream side of the ORC system 14 as shown. The heat exchanger 18 includes a pair of parallel flow circuits 19 and 21, with the first flow circuit 19 being fluidly interconnected between the pump 13 and the ORC system 14 such that the geothermal water passes therethrough as it is pumped to the ORC system 14. The two flow paths through the heat exchanger 18 may be in parallel, cross-flow or counter-flow.

A plurality of solar collectors 22 are fluidly interconnected between an input manifold 23 and an output manifold 24. The solar collectors 22 are arranged in an array that typically covers an area of about 15 acres and are operative to use the heat of the sun to heat the fluid being passed therethrough to a temperature of around 300° C. (can be as high as 500° C.) as it enters the output manifold 24. From there, the heated fluid, which is typically water, a water-antifreeze mixture (propylene glycol), or silicone oil, for example, flows, preferably in the opposite direction of the flow in flow circuit 19, along input line 26, through the flow circuit 21 and back through the output line 27. In the process, the heat from the solar collector fluid is transferred to the flow circuit 21 to thereby increase the temperature, and therefore the energy level, of the geothermal water being passed to the ORC system 14. This increase in temperature is cause for more efficient operation of the ORC system 14 and therefore decreases the needed flow rates and the parasitic power needed to power the pump 13 and also increases the temperature of the geothermal water being returned to the sink of the geothermal source 11 along line 16, thus delaying the onset of well depletion/chilling. In addition, during operation on hot days, when the high ambient temperatures may decrease the efficiency of the ORC system 14, a boost in the temperature of the geothermal water will help increase the available source temperature and compensate for the higher ambient temperatures.

Figure 1A:
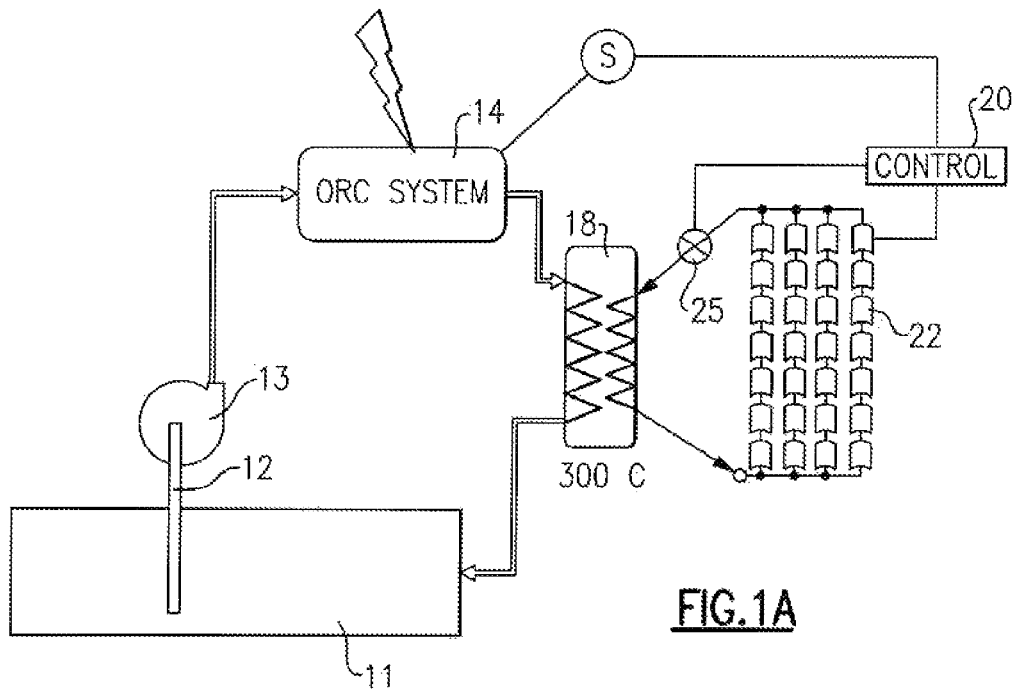
FIG. 1A is a schematic illustration of an alternative embodiment thereof.

It should be mentioned that the solar collector 22 and their associated heat exchanger 18 can, alternatively, be installed on the downstream side of the ORC system 14 with the working fluid then being passed to the sink of the geothermal source 11 as shown in FIG. 1A. In this case a control 20 determines the temperature of the solar fluid and ensures that the valve 25 is only opened during periods in which the temperature of the solar fluid is greater than that of the working fluid leaving the ORC system 14.

Figure 1B:
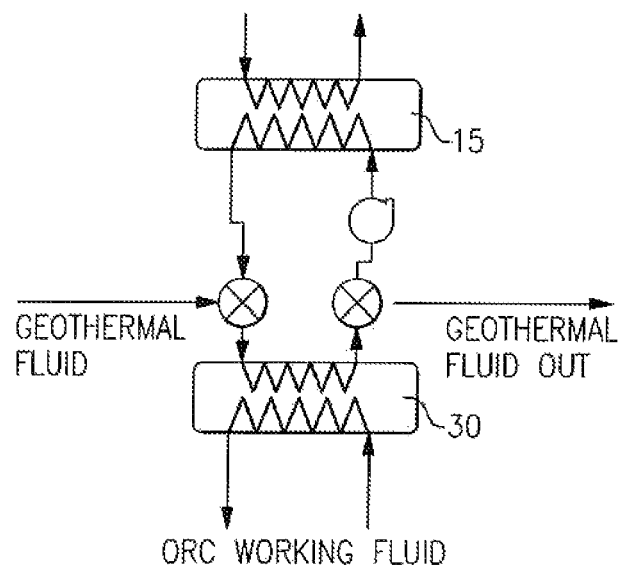
FIG. 1B is a schematic illustration of another alternative embodiment of the invention.

In the case where an ORC system has already been installed to operate from a geothermal source, it may be desirable to retrofit the system by the further integration of a solar collector system therein. This can be accomplished by an arrangement as shown in FIG. 1B wherein the solar heat exchanger 15 is connected in such a manner as shown to raise the temperature of the geothermal fluid at the exit of the evaporator 30 and send it back as a recycled stream to the inlet of the evaporator 30. The geothermal well pump flow is then adjusted on the basis of available solar thermal temperature. Such a system can reduce parasitic pump power and assist in reducing the depletion of available geothermal energy.

Figure 2:
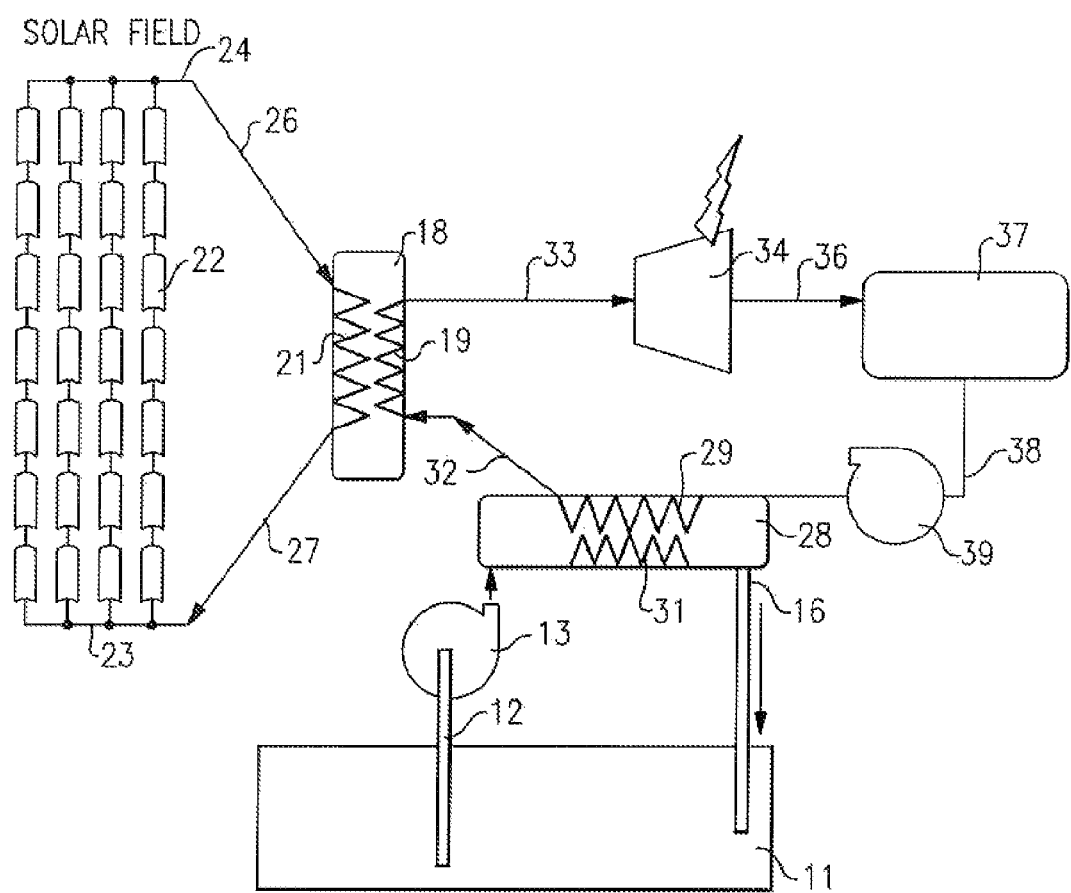
FIG. 2 is another alternative embodiment thereof.

In the FIG. 2 embodiment, a second heat exchanger 28 is added to the system, with the second heat exchanger 28 having parallel flow circuits 29 and 31 as shown. The second heat exchanger 28 then acts as a first stage heat exchanger which provides for heat transfer from the geothermal water closed loop to a closed loop flow of the refrigerant within the ORC system. That is, geothermal water flows from the geothermal source 11 through the source pipe 12, the pump 13, through the flow circuit 31, and back down through the return pipe 16 to the geothermal source 11. The flows in the two flow circuits 29 and 31 are preferably in opposite directions to obtain better heat transfer characteristics.

Within the ORC working medium circuit, the second heat exchanger 28 and the first heat exchanger 18 (i.e. second stage heat exchanger) acts as a boiler or evaporator for the refrigerant within the ORC circuit. That is, the ORC working fluid or refrigerant first passes through the flow circuit 29 where its temperature is increased by the heat transferred from the flow circuit 31. The fluid then flows along line 32 and through the flow circuit 19 of the heat exchanger 18 where further heat is transferred from the flow circuit 21 to the working medium of the ORC system. The higher temperature fluid then passes along line 33 to the turbine 34 of the ORC system where its energy is converted to electrical energy. The lower temperature refrigerant then passes along line 36 to the ORC condenser 37, with the condensed fluid then passing along line 38 and pump 39 back to the second heat exchanger 28 to complete the circuit.

In such a two-stage system, one approach is to use the geothermal fluid to preheat the working fluid and the solar fluid to evaporate the working fluid. Thus, the heat from the solar fluid may be selectively applied to control the degree of superheat so as to thereby reduce the risk of turbine damage during operation.

Figure 3:
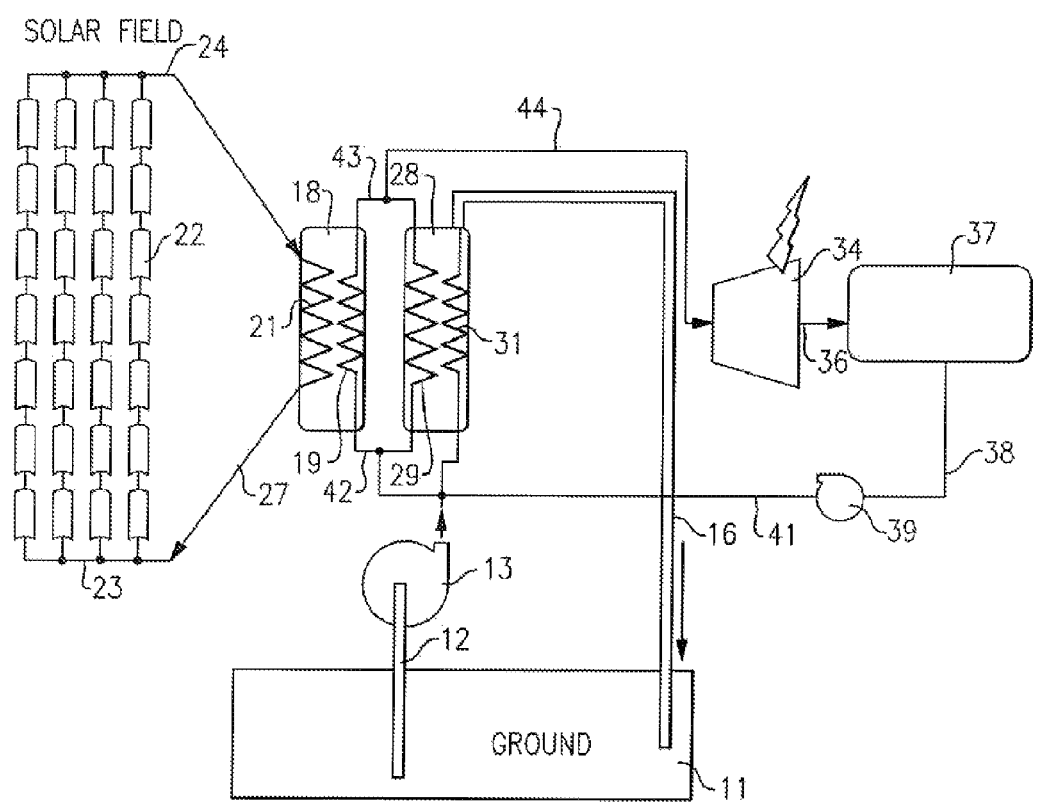
FIG. 3 is another alternative embodiment thereof.

An alternative embodiment of the disclosure is shown in FIG. 3 wherein the heat exchangers 18 and 28, rather than being arranged in series flow relationship as shown in FIG. 2, are shown in a parallel flow relationship. As before, the heat exchanger 18 is arranged to receive heat from the solar collectors 22, and the heat exchanger 28 is arranged to receive heat from the geothermal source 11. The liquid fluid flows from the condenser 37 along line 38 to the pump 39 and then to line 41, which then carries the flow to a common inlet manifold 42. The flow then divides with a portion flowing through the flow circuit 19 and a portion flowing through the flow circuit 29, after which the flows are joined at a common outlet manifold 43. From there the heated working fluid vapor passes along line 44 to the turbine 34.

Figure 4:
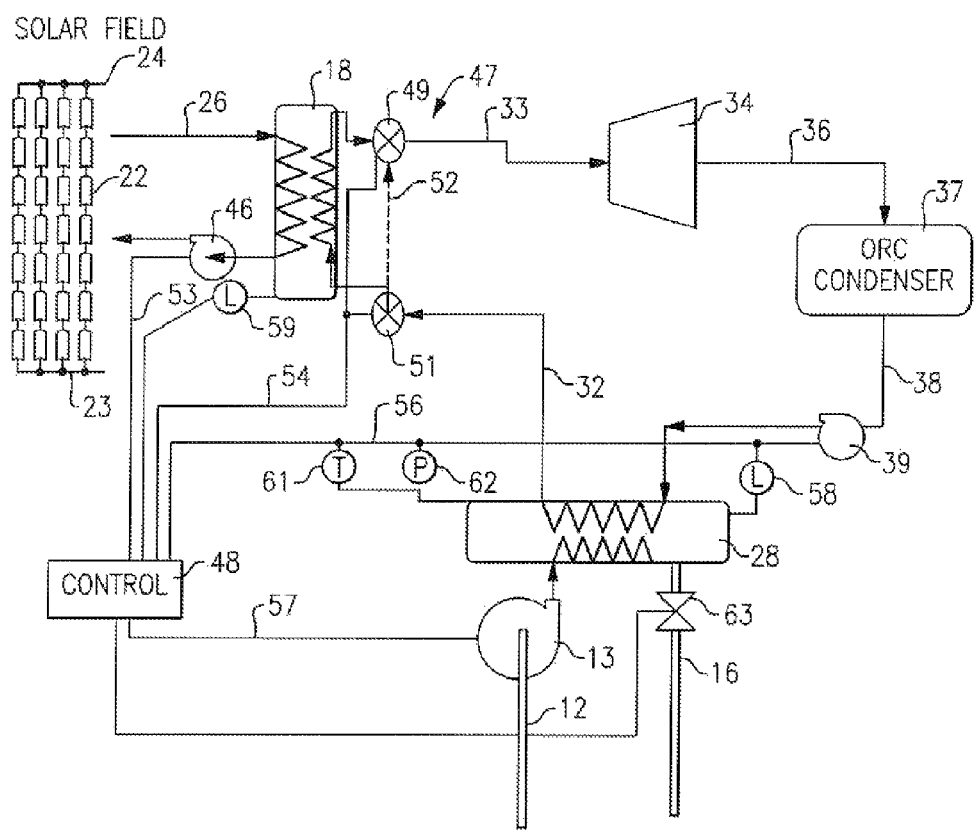
FIG. 4 is a schematic illustration of the system with additional features to facilitate control of the various fluid flows.

Recognizing that the capacity of both the geothermal source 11 and the solar collectors may vary substantially from time to time, primarily because of seasonal variations and weather variations, there is a need to balance the effective effects of the geothermal source and the solar collectors 22 as they operate in combination with the organic rankine cycle system. Such control features are shown in FIG. 4 and include a solar pump 46, a solar bypass arrangement 47 and a control 48. The solar pump 46 can be selectively modulated in speed so as to control the amount of solar fluid that passes to the heat exchanger 18. The solar bypass arrangement includes the valves 49 and 51 interconnected by a bypass line 52. The valves 49 and 51 are two-position valves which, when placed in their first position, allow for the passage of the geothermal fluids though the heat exchanger 18 in the manner as described hereinabove. When placed in their second positions, the valves 49 and 51 cause the heat exchanger 18 to be bypassed such that the geothermal fluid passes directly from the heat exchanger 28 to the turbine 34 by way of the bypass line 52.

As will be seen, the control 48 is controllably connected to the solar pump 46 by line 53, to the valves 49 and 51 by line 54, to the condensate pump 39 by line 56, and to the geothermal pump 13 by line 57. The control 48 can thus be selectively operated so as to vary the respective speeds of the pumps in such a manner as to maintain a desired balance between the fluid flows and the system as will be described hereinafter. In this way the degree of geothermal well production and/or the amount of solar thermal energy sent to the evaporator is controlled. This control may vary the geothermal well production subject to solar thermal collection (solar leading approach) or it may vary the solar thermal input subject to geothermal well production (geothermal leading approach).

Considering now the manner in which the control 48 may be applied to control the flow of fluid within the system, further reference is made to FIG. 4 wherein additional sensors are shown to indicate the condition of the fluids in various parts of the system. Thus, level sensors 58 and 59 are provided for sensing the level of fluid in each of the heat exchangers 28 and 18, respectively. Further, the sensors 61 and 62 are shown at the discharge end of the heat exchanger 28 to indicate the temperature and pressure of the working fluid leaving the heat exchanger 28 and passing to either the turbine 34 or the heat exchanger 18. Also provided is a one way valve 63 in the line 16 which returns geothermal fluid from the heat exchanger 28 back to the ground. Each of the sensors 58-62, as well as the valve 63 is connected to the control 48 as shown.

It should be understood that either or both of the pumps 13 and 39 can be of the variable speed type. If the geothermal pump 13 is a single speed pump, however, then control of the flow of geothermal fluid into the heat exchanger 28 may be established by a one way valve 63 as shown in FIG. 4. Control of the one way valve 63 may be maintained by any of the approaches set forth in FIGS. 5A-5C.

If the geothermal source 11 is used by itself, then control of the one way valve 63 can be accomplished with either approach as set forth in FIG. 5A or FIG. 5B. In FIG. 5A, the level set point for the fluid level in the heat exchanger 28 is sent to a comparator 64 and compared with the level feedback from the sensor 58, with the difference being sent to a PID (proportional integral and differential) with the output then passing to the one way valve 63 to selectively actuate it to a more open or more closed position, accordingly.

In the FIG. 5B embodiment, the power set point and the power feedback are compared in a comparator 67, with the difference being passed to the PID 68 to control the one way valve 63 in a similar manner.

In the case of the solar and geothermal being used in combination, the control may be maintained as shown in FIG.

5C, wherein, again, the power set point and power feedback are sent to a comparator 69 with the difference then passing to a PID 71. The output of the PID 71 then passes to the pressure sensor 62 and then to a saturation temperature calculator 72. That result in temperature is then compared with the sensed temperature from sensor 61 in the comparator 73 with the result passing to the PID 74 whose output then controls the one way valve 63.

Figure 6B:
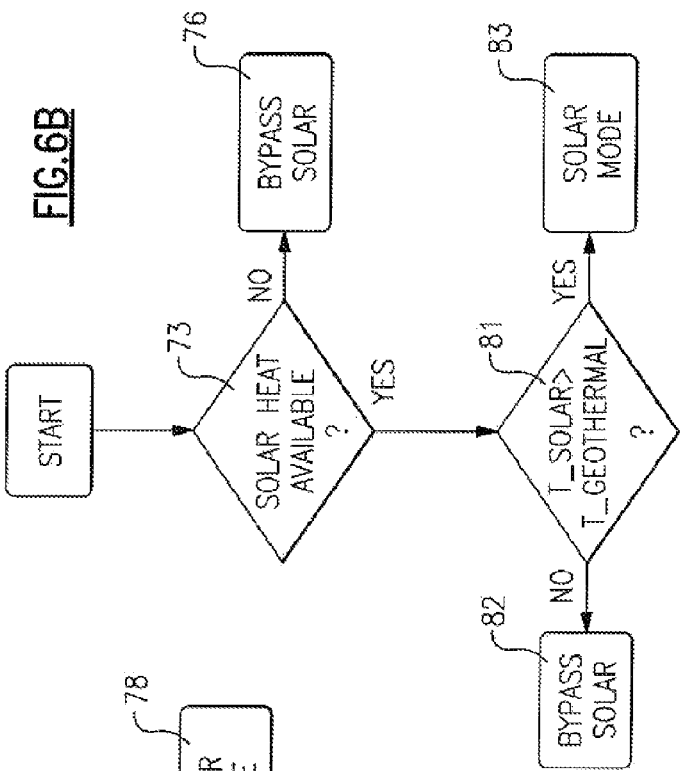
FIGS. 6A and 6B are flow diagrams of control methods that may be employed.
Figure 6A:
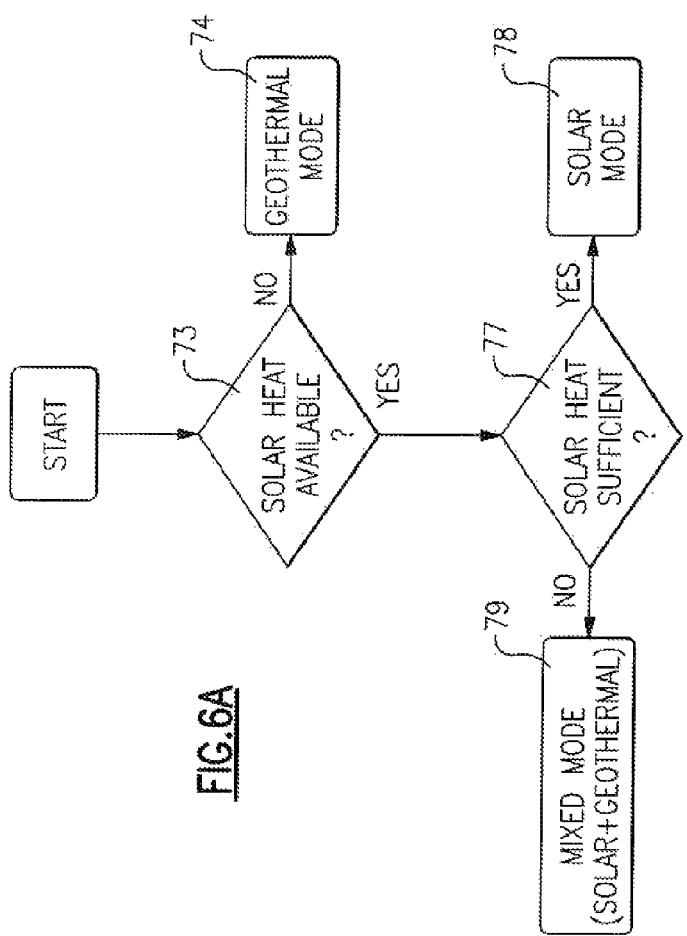

Recognizing that, while the energy from the geothermal source will be consistently available, that from the solar collectors will be dependent on various factors such as the weather. Accordingly, provision must be made to determine whether solar energy is available and if so to what degree. This can be accomplished by either of the control functions as set forth in FIGS. 6A and 6B. In each, there is determined in block 73 whether solar heat is available, and if not, the proper operational mode is selected. In FIG. 6A, the system is made to operate in a geothermal mode as shown in block 74. In FIG. 6B, the valves are operated so as to bypass the solar system as shown in FIG. 4.

If the solar heat is available, then the determination may be made, in block 77 of FIG. 6A, as to whether or not it is sufficient (as determined by the level sensor 59 in FIG. 4). If it is determined to be sufficient, then it is possible to operate in the solar mode only as shown at block 78, and if not, then a mixed mode is prescribed as shown at block 79.

In accordance with another embodiment as shown in FIG. 6B, where it is found that solar heat is available as determined in block 73, then it is determined in block 81 whether the temperature of the solar fluid is greater than the temperature of the geothermal fluid. If not, then the solar system may be bypassed as shown in block 82, and if so, then the working fluid is made to pass through the solar heat exchanger as shown in block 83.

While the present disclosure has been particularly shown and described with reference to preferred and modified embodiments as illustrated in the drawings, it will be understood by one skilled in the art that various changes in detail may be effected therein without departing from the spirit and scope of the disclosure as defined by the claims.

We claim:

1. An energy recovery system for use with a geothermal source containing a fluid which can be removed at a higher temperature and returned at a lower temperature, comprising:
   an organic rankine cycle system having a closed loop circuit with a working fluid being circulated therethrough;
   at least one heat exchanger fluidly connected to said organic rankine cycle system and to be connected to a geothermal fluid for selectively transferring heat from the geothermal fluid to said organic rankine cycle system;
   a solar collector thermally coupled to said at least one heat exchanger for selectively transferring heat from said solar collector to said organic rankine cycle system; and
   a control for controlling the energy recovery system, said control determining whether solar heat is available from said solar collector, and if heat is available from said solar collector, determining whether sufficient solar heat is available to provide energy recovery without heat from the geothermal fluid, and operating in a solar mode alone if there is sufficient solar heat available, operating in a geothermal mode only if there is no solar heat available, and operating in combination of the solar and geothermal modes if there is solar heat available, but it is not sufficient.

2. An energy recovery system as set forth in claim 1 wherein said at least one heat exchanger comprises two heat exchangers with one heat exchanger being so connected as to transfer heat from the geothermal fluid to the working fluid of the organic rankine cycle system and the other heat exchanger being so connected as to transfer heat from the solar collector to the working fluid of the organic rankine cycle system.

3. An energy recovery system as set forth in claim 2 wherein the energy recovery system is configured for the working fluid to pass first through the one heat exchanger and then through the other heat exchanger.

4. An energy recovery system as set forth in claim 3 wherein the energy recovery system is configured for the working fluid to then pass to a turbine of the organic rankine cycle system.

5. An energy recovery system as set forth in claim 2 wherein the energy recovery system is configured for the working fluid to pass through the two heat exchangers in parallel.

6. An energy recovery system as set forth in claim 1 and including a pump for circulating the flow of geothermal fluid from the geothermal source to the organic rankine cycle system.

7. An energy recovery system as set forth in claim 1 and including a return flow conduit for conducting the flow of geothermal fluid back to said geothermal source.

8. An energy recovery system as set forth in claim 2 and including a pump for circulating said working fluid through said rankine cycle closed loop.

9. An energy recovery system as set forth in claim 8 wherein said pump is a variable speed pump and includes a control for selectively controlling the operating speed thereof.

10. An energy recovery system as set forth in claim 2 and including a second pump for pumping the geothermal fluid from a geothermal source.

11. An energy recovery system as set forth in claim 2 and including a valve that can be selectively controlled to modulate the flow from the geothermal source and a control for controlling said valve.

12. An energy recovery system as set forth in claim 11 and including a sensor for sensing the level of liquid in said one heat exchanger and further wherein said valve is controlled as a function of the difference between a sensed level of liquid in said at least one heat exchanger and a predetermined set point.

13. An energy recovery system as set forth in claim 11 and including a control for operating said valve as a function of the difference between a power feedback signal from said organic rankine cycle and a predetermined power set point.

14. An energy recovery system as set forth in claim 13 and including a pressure sensor and a temperature sensor for determining the pressure and temperature of the working fluid being discharged from said at least one heat exchanger and further wherein said valve is controlled as a function of those sensed pressure and temperature conditions.

15. An energy recovery system as set forth in claim 1, wherein the temperature of a fluid being heated by said solar collector is sensed to determine whether sufficient solar heat is available.

16. A method of operating an energy recovery system comprising the steps of:
   circulating a working fluid through an organic rankine cycle system having a closed loop circuit, and at least one heat exchanger, said at least one heat exchanger receiving the working fluid, and said at least one heat exchanger being selectively heated by a geothermal fluid obtained from a geothermal source, and also being heated by a solar fluid which is heated by a solar collector also thermally coupled to said at least one heat exchanger for selectively transferring heat from said solar collector to said working fluid; and determining whether solar heat is available from said solar collector, and if heat is available from said solar collector, determining whether sufficient solar heat is available to provide energy recovery without the geothermal fluid, and operating in a solar mode alone if there is sufficient solar heat available, operating in a geothermal mode only if there is no solar heat available, and operating in combination of the solar and geothermal modes if there is solar heat available, but it is not sufficient.

17. The method as set forth in claim 16 and further including the step of selectively controlling a value to modulate the flow from the said geothermal source.

18. The method as set forth in claim 17 and including the step of sensing the level of liquid in said one heat exchanger and further wherein said valve is controlled as a function of the difference between a sensed level of liquid in said at least one heat exchanger and a predetermined set point.

19. The method as set forth in claim 17 and further including the step of operating said valve as a function of the difference between a power feedback signal from said organic rankine cycle and a predetermined power set point.

20. The method as set forth in claim 19 and further including the step of determining a pressure and temperature of the working fluid being discharged from said at least one heat exchanger and further wherein said valve is controlled as a function of sensed pressure and temperature conditions.

* * * * *